UNITED STATES PATENT OFFICE.

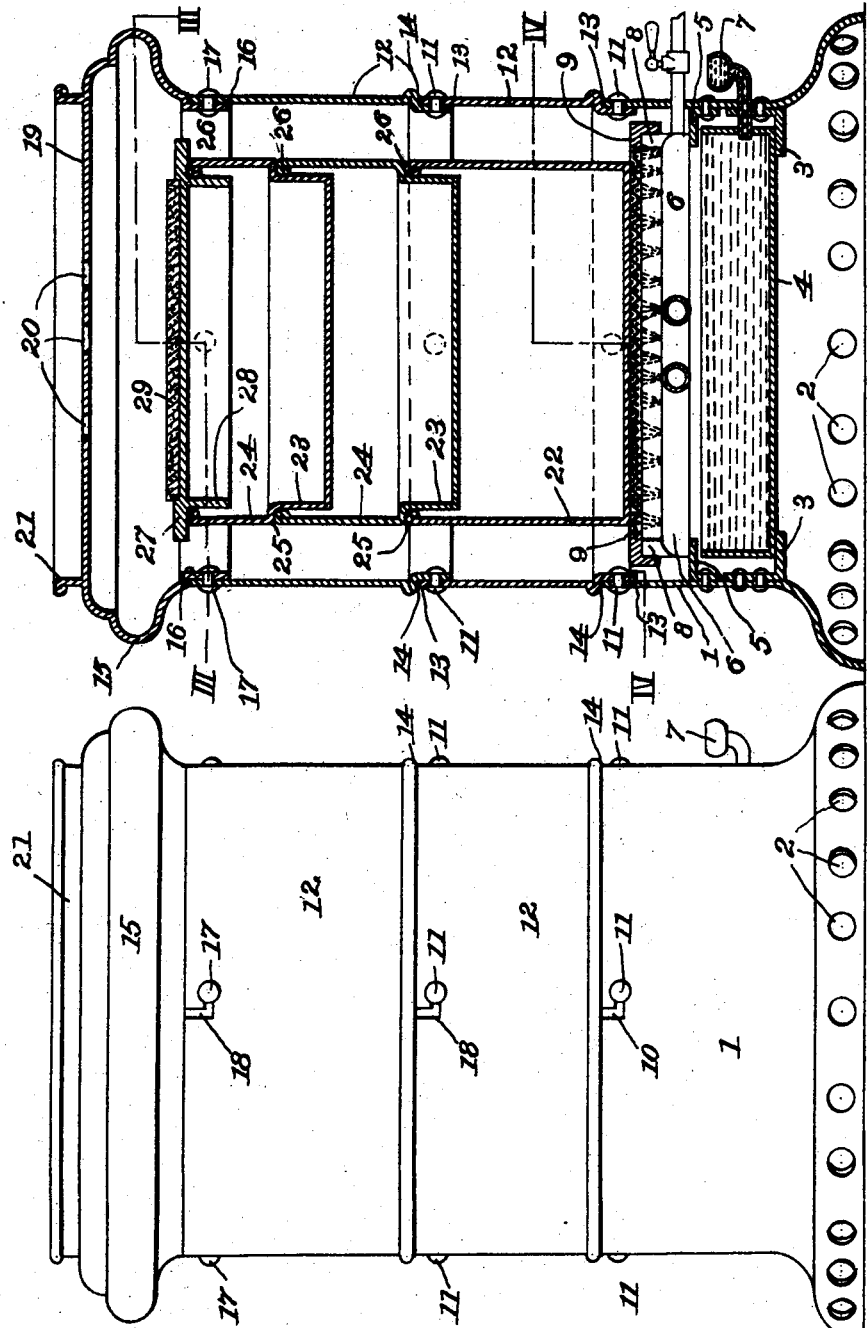

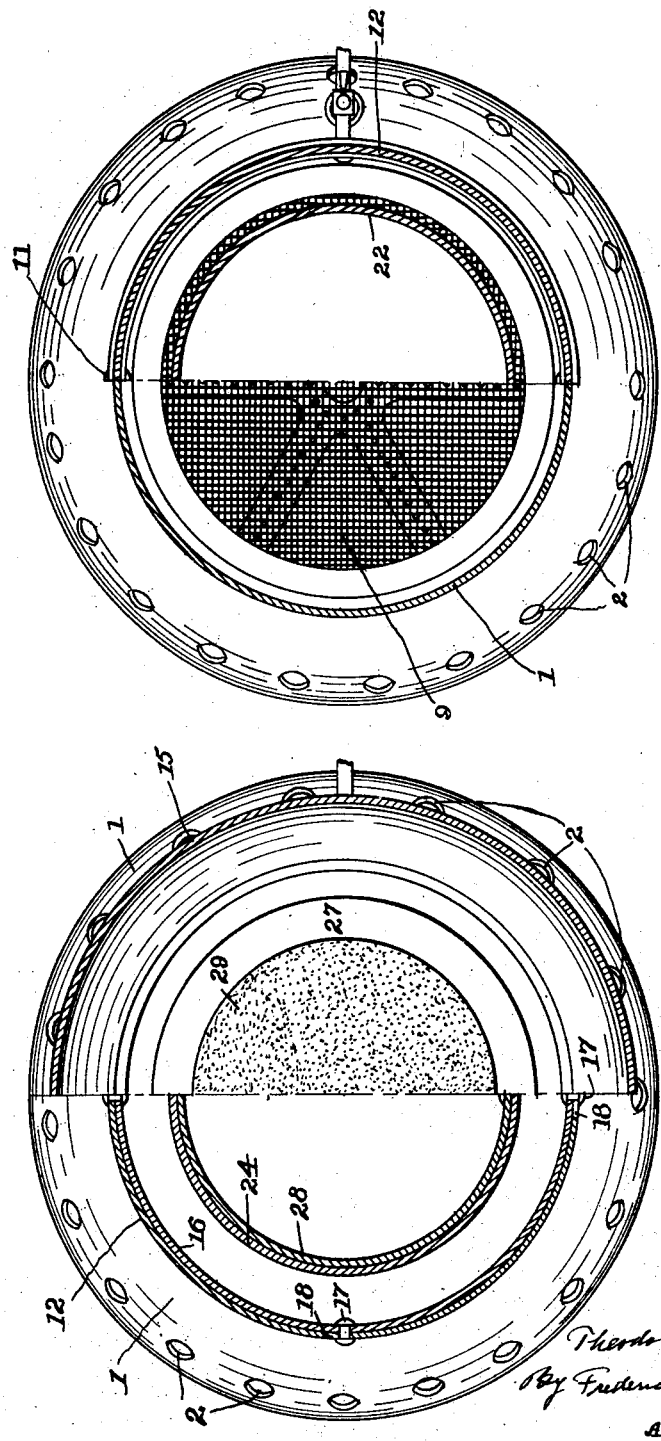

THEODORE KAUFER, OF NEW YORK, N. Y., ASSIGNOR TO KAUFER MANUFACTURING COMPANY, INC., OF NEW YORK, N. Y., A CORPORATION OF NEW YORK.

COOKING-STOVE.

1,400,221. Specification of Letters Patent. Patented Dec. 13, 1921.

Refiled for forfeited application Serial No. 269,570, filed January 4, 1919. This application filed July 30, 1921. Serial No. 489,926.

*To all whom it may concern:*

Be it known that I, THEODORE KAUFER, a citizen of the United States, residing at New York, in the county of Bronx and State of New York, have invented certain new and useful Improvements in Cooking-Stoves, of which the following is a full, clear, and exact specification.

This invention relates to cooking stoves of the type using gas, liquid fuel or electricity as a heating medium, and has for its object to provide a compact portable stove of improved design and construction which is adapted to cook several different articles of food at the same time. Subsidiary objects are to conserve fuel and increase the scope of usefulness of a stove of this kind. Other objects will appear as the description proceeds. The invention disclosed herein was originally presented in my forfeited application filed January 4, 1919, Serial No. 269,570.

The invention will be first hereinafter described in connection with the accompanying drawings, which constitute part of this specification, and then more specifically defined in the claims at the end of the description.

In the accompanying drawings, wherein similar reference characters are used to designate corresponding parts in the several views:—

Figure 1 is an elevation of a stove constructed substantially in accordance with this invention.

Fig. 2 is a central vertical section of the same.

Fig. 3 is a section on the line III—III of Fig. 2, and

Fig. 4 is a section on the line IV—IV of Fig. 2.

The invention comprises essentially a base section 1 having air intake openings 2 therein and provided with brackets 3 for supporting a water pan or reservoir 4, and other brackets 5 for supporting a burner or heater 6. While a gas burner is shown in the drawings, it will be understood that other forms of burners or heaters may be used interchangeably therewith, such as oil or alcohol burners or electric heaters, the specific form of the burner or heater constituting no part of the present invention.

The base section 1 is in the form of a shell and is preferably round in horizontal section with cylindrical walls extending upward from a flared bottom portion, as shown. The water pan or reservoir 4 has a filling nozzle 7 arranged outside of the base section 1 and extending up to the water level in said receptacle or pan, the upper end of said nozzle being flared or cup-shaped so that the level of the water in the receptacle may be ascertained by observing its level in the nozzle.

The burner 6 is preferably provided with upstanding lugs 8 for supporting a woven wire frame 9 on which the flames from the burner play. The base section 1 of the stove shell preferably terminates slightly above the level of the frame 9, and the upper edge of the walls of said base section has formed therein a series of spaced bayonet slots 10 to receive locking pins or rivets 11 on the lower edge of a supplemental shell section 12, which is cylindrical in form and forms a continuation of the walls of the base section. Any number of supplemental shell sections of any suitable height may be superposed one upon another to build up the shell of the stove as desired. In the drawings, two such supplemental sections 12 are shown, each having an inset lower flange 13 carrying the pins or rivets 11 and a circumferential shoulder 14 above said inset flange to seat upon the upper edge of the section immediately below it.

A top section 15 has an inset flange 16 carrying pins or rivets 17 to engage the bayonet slots 18 in the upper edge of the uppermost supplemental section 12, it being noted that each of said supplemental sections has similar bayonet slots. The top section may be of any desired or ornamental shape and has its upper surface 19 provided with a series of comparatively small openings or perforations 20. An upstanding flange 21 surrounds the upper surface 19 for retaining dishes or utensils which may be placed thereon for keeping their contents warm.

Inside the shell of the stove, which is built up as already described, a superimposed series of cooking vessels is placed in spaced relation to the walls of the shell, as illustrated in Fig. 2. The bottom vessel 22 rests upon the wire frame 9, while the other vessels 24 have reduced lower or bottom portions 23 to set down in the upper ends of the vessels immediately below. Circumferential shoulders 25 at the upper ends of the reduced portions 23 of the upper vessels rest on the upper edges of the vessels below, the walls of all the vessels being preferably in vertical alinement. The number of cooking vessels used may, of course, be varied to suit requirements, and the upper edge of each is preferably provided with an inwardly turned bead 26 to strengthen it.

Upon the uppermost cooking vessel is placed a cover plate 27 having a depending flange 28 to fit in said vessel. Said cover plate has a layer of soapstone or other suitable material on its upper face, as shown at 29, Fig. 2, said stone being useful for cooking batter cakes or the like when the top section 15 is removed from the outer shell of the stove.

In operation, the heat generated by the burner and confined by the outer shell of the stove acts first upon the bottom cooking vessel 22 and then travels upward through the superimposed vessels 24, thus cooking the contents of all of the vessels. When the heat units reach the top of the stove they are turned back by the top surface 19 and travel down along the walls of the shell until they strike the surface of the water in the reservoir 4, and convert some of it into steam which rises again with the heat units. The water reservoir not only permits the formation of steam to aid in the cooking operation, but also prevents the bottom of the stove or the surface on which it may be placed from being burned out. During the heating operation, fresh air is taken in to support combustion through the openings 2 in the base 1. The openings or perforations 20 in the top surface of the section 15 serve to permit the escape of dead heat.

I claim:

1. In a cooking stove, the combination with an outer shell composed of a ring-shaped base section and a separable ring-shaped section superposed upon said base section, of a water container removably supported in said base section, a burner removably supported in the base section directly over said water container, lugs on said burner projecting above the top surface thereof, a perforated frame removably supported over the burner on said lugs, and a cooking vessel supported on said frame inside the upper section of the shell and over the burner.

2. In a cooking stove, the combination with an outer shell, of a heat-generator therein, a cooking vessel supported in the shell over the heat-generator, a cover for said vessel having a griddle on its upper surface, and a removable cover for the shell adapted to inclose the vessel cover and griddle when the latter is not in use.

3. In a cooking stove, the combination with an outer shell, of a detachable top section for the shell, a heat-generator in said shell, a cooking vessel supported in the shell over the heat-generator, and a cover for said vessel having a layer of soapstone on its upper surface to serve as a griddle when the top section of the shell is removed.

In testimony whereof I have signed my name to this specification.

THEODORE KAUFER.